US011397685B1

(12) United States Patent
Ishii et al.

(10) Patent No.: US 11,397,685 B1
(45) Date of Patent: Jul. 26, 2022

(54) STORING PREDICTION ENTRIES AND STREAM ENTRIES WHERE EACH STREAM ENTRY INCLUDES A STREAM IDENTIFIER AND A PLURALITY OF SEQUENTIAL WAY PREDICTIONS

(71) Applicant: Arm Limited, Cambridge (GB)

(72) Inventors: Yasuo Ishii, Austin, TX (US); Chang Joo Lee, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/183,754

(22) Filed: Feb. 24, 2021

(51) Int. Cl.
*G06F 12/0864* (2016.01)

(52) U.S. Cl.
CPC .. *G06F 12/0864* (2013.01); *G06F 2212/6032* (2013.04)

(58) Field of Classification Search
CPC ............. G06F 12/0864; G06F 2212/6032
USPC ........................... 711/137, 128, 118
See application file for complete search history.

(56) References Cited

U.S. PATENT DOCUMENTS

| 2004/0030838 | A1* | 2/2004 | van de Waerdt | G06F 9/3832 |
| | | | | 711/137 |
| 2008/0046658 | A1* | 2/2008 | Goodman | G06F 12/0862 |
| | | | | 711/137 |
| 2014/0201449 | A1* | 7/2014 | Sassone | G06F 12/0864 |
| | | | | 711/125 |
| 2014/0337605 | A1* | 11/2014 | Hall | G06F 9/3806 |
| | | | | 712/239 |
| 2017/0046266 | A1* | 2/2017 | McIlvaine | G06F 12/128 |
| 2017/0060750 | A1* | 3/2017 | Krishna | G06F 12/0895 |
| 2019/0166158 | A1* | 5/2019 | Grocutt | H04L 63/1416 |
| 2021/0089472 | A1* | 3/2021 | Ishii | G06F 12/0875 |

* cited by examiner

*Primary Examiner* — Hong C Kim
(74) *Attorney, Agent, or Firm* — Nixon & Vanderhye P.C.

(57) ABSTRACT

There is provided a data processing apparatus and method for storing a plurality of prediction cache entries in a prediction cache with associativity greater than one comprising a plurality of prediction cache ways, each of the plurality of prediction entries defining an association between a prediction cache lookup address and target information; and storing a plurality of stream entries, each stream entry corresponding to a sequence of prediction cache lookup addresses and comprising: a stream identifier defined by two or more sequential prediction cache lookup addresses of the sequence, and a plurality of sequential way predictions, each way prediction of the plurality of sequential way predictions defining, for a given position in the sequence of prediction cache lookup addresses, a prediction cache way to be looked up in the prediction cache to identify a prediction entry associated with the prediction cache lookup address at the given position in the sequence.

18 Claims, 8 Drawing Sheets

Stream: A → B → C → D  82

| | Latched address | Current address | Stream identifier | Stream length | position counter | Way prediction 0 | Way prediction 1 | Way prediction 2 | Way prediction 3 |
|---|---|---|---|---|---|---|---|---|---|
| 82(A) | | A | | | | | | | |
| 82(B) | A | B | (A, B) | 0 | 0 | 001 | | | |
| 82(C) | B | C | (A, B) | 1 | 1 | 001 | 111 | | |
| 82(D) | C | D | (A, B) | 2 | 2 | 001 | 111 | 010 | |
| 82(E) | D | A | (A, B) | 3 | 3 | 001 | 111 | 010 | 010 |
| 82(F) | A | B | (A, B) | 3 | 0 | 001 | 111 | 010 | 010 | prediction cache

| | way 00 | way 01 | way 10 | way 11 |
|---|---|---|---|---|
| Index 0 | | | | |
| Index 1 | | B → C | | |
| Index 2 | | | A → B | |
| Index 3 | | | D → A | |
| Index 4 | | | | |
| Index 5 | | | | |

STORING PREDICTION ENTRIES AND STREAM ENTRIES WHERE EACH STREAM ENTRY INCLUDES A STREAM IDENTIFIER AND A PLURALITY OF SEQUENTIAL WAY PREDICTIONS

TECHNICAL FIELD

The present invention relates to data processing. More particularly the present invention relates to a prediction cache.

BACKGROUND

Some data processing apparatuses support prediction by storing prediction entries defining an association between a prediction cache lookup address and target information. Some prediction caches may be provided with associativity greater than one such that each prediction cache entry is stored in one of a plurality of ways. There is a trade off when providing prediction cache structures between size and efficiency. Increasing the associativity of the prediction cache can improve performance whilst increasing power usage.

SUMMARY

In example configurations described herein there is data processing apparatus comprising:
a prediction cache with associativity greater than one comprising a plurality of prediction cache ways to store a plurality of prediction entries, each of the plurality of prediction entries defining an association between a prediction cache lookup address and target information;
stream detector circuitry to store a plurality of stream entries, each stream entry corresponding to a sequence of prediction cache lookup addresses and comprising:
a stream identifier defined by two or more sequential prediction cache lookup addresses of the sequence, and
a plurality of sequential way predictions, each way prediction of the plurality of sequential way predictions defining, for a given position in the sequence of prediction cache lookup addresses, a prediction cache way to be looked up in the prediction cache to identify a prediction entry associated with the prediction cache lookup address at the given position in the sequence.

In example configurations described herein there is a data processing method comprising:
storing a plurality of prediction cache entries in a prediction cache with associativity greater than one comprising a plurality of prediction cache ways, each of the plurality of prediction entries defining an association between a prediction cache lookup address and target information; and
storing a plurality of stream entries, each stream entry corresponding to a sequence of prediction cache lookup addresses and comprising:
a stream identifier defined by two or more sequential prediction cache lookup addresses of the sequence, and
a plurality of sequential way predictions, each way prediction of the plurality of sequential way predictions defining, for a given position in the sequence of prediction cache lookup addresses, a prediction cache way to be looked up in the prediction cache to identify a prediction entry associated with the prediction cache lookup address at the given position in the sequence.

BRIEF DESCRIPTION OF THE DRAWINGS

The present invention will be described further, by way of example only, with reference to embodiments thereof as illustrated in the accompanying drawings, in which:

FIG. 5 schematically illustrates a sequence of steps for storing way predictions in stream detector circuitry;

DESCRIPTION OF EXAMPLE EMBODIMENTS

Figure 1:
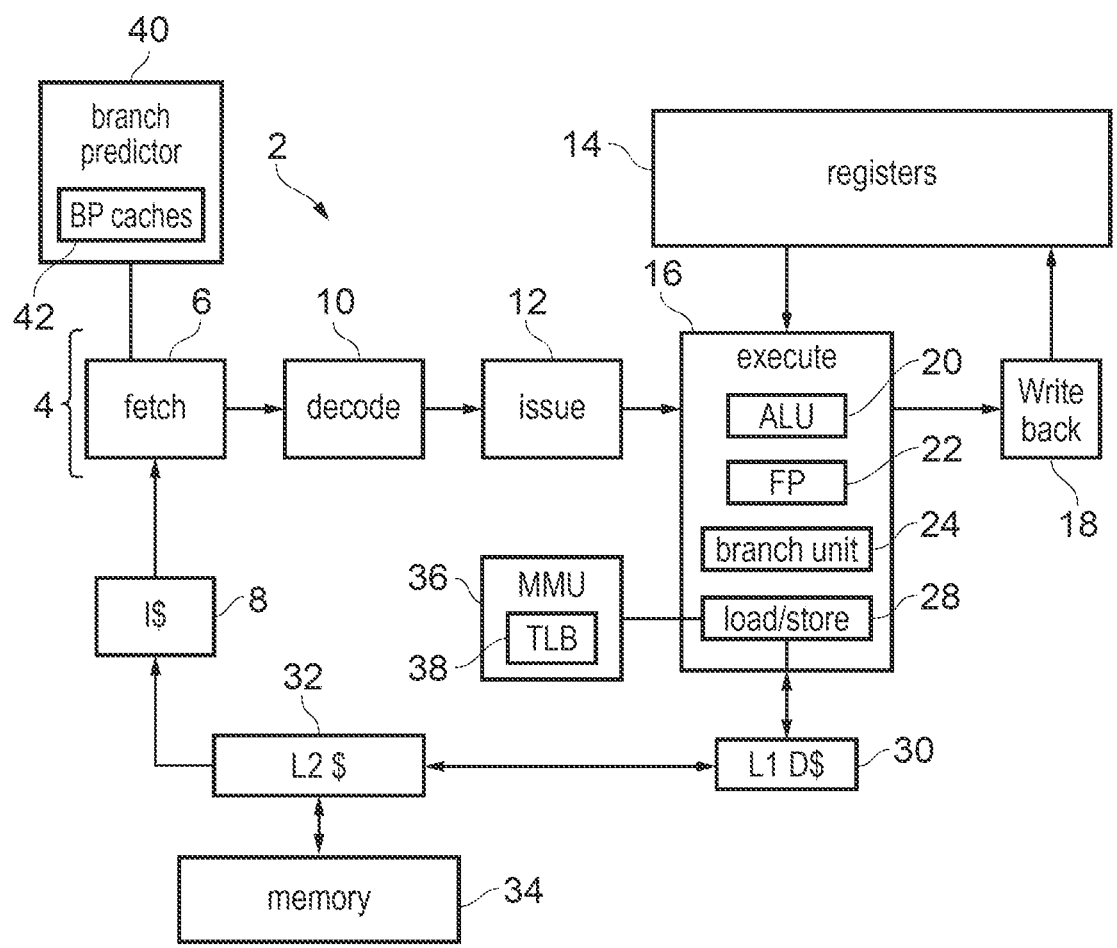
FIG. 1 schematically illustrates details of a data processing apparatus.

Before discussing the embodiments with reference to the accompanying figures, the following description of embodiments is provided.

In accordance with some example configurations there is provided a data processing apparatus comprising: a prediction cache with associativity greater than one. The prediction cache comprises a plurality of prediction cache ways to store a plurality of prediction entries, each of the plurality of prediction entries defining an association between a prediction cache lookup address and target information. The data processing apparatus further comprises stream detector circuitry to store a plurality of stream entries, each stream entry corresponding to a sequence of prediction cache lookup addresses. Each of the stream entries comprises a stream identifier defined by two or more sequential prediction cache lookup addresses of the sequence, and a plurality of sequential way predictions. Each way prediction of the plurality of sequential way predictions defines, for a given position in the sequence of prediction cache lookup addresses, a prediction cache way to be looked up in the prediction cache to identify a prediction entry associated with the prediction cache lookup address at the given position in the sequence.

When a data processing apparatus has a prediction cache with associativity greater than one, for a given prediction cache lookup it is not, in general, known a-priori which way of the prediction cache will contain an entry that hits in response to the prediction cache lookup. Therefore, a prediction cache with associativity greater than one requires additional lookup steps to be performed in order to determine which (if any) way of the plurality of ways contains an entry that the lookup address hits. The inventors have realised that, for repeated sequences of prediction cache lookup addresses, predictions of which way of the prediction cache should be looked up to obtain the target information for a given position in the sequence can be organised in "streams". Hence, there is provided stream detector circuitry to store a plurality of stream entries. Each stored stream entry corresponds to a previously observed sequence of prediction cache lookup addresses. Stream entries comprise a stream identifier which is based on two or more sequential prediction cache lookup addresses. The stream identifier may, for example, be generated through concatenating the two or more sequential prediction cache lookup addresses. Alternatively, the stream identifier may be defined by a portion of the two or more sequential prediction cache lookup addresses or a hash of at least a portion of each of the two or more sequential prediction cache lookup addresses. Furthermore, each of the stream entries comprises a plurality of sequential way predictions such that, for a given position in the sequence of prediction cache lookup addresses, the stream detector circuitry is able to provide a way prediction from the plurality of way predictions to be used in combination with the prediction cache lookup to determine which ways of the prediction cache should be looked up and for which ways of the prediction cache the lookup should be suppressed. By identifying the stream entry based on the stream identifier, the plurality of sequential way predictions associated with the stream as a whole can be identified without the need for incurring the power cost of separate tag comparisons for each individual address within the stream.

In accordance with some example configurations the two or more sequential prediction cache lookup addresses comprises fewer prediction cache lookup addresses than a sequence length of a number of prediction cache lookup addresses in the sequence. For a repeated sequence the sequence length is a length (number of prediction cache lookup addresses) of a single instance of the sequence. For example, if the sequence comprises repeatedly performing eight sequential prediction cache lookup addresses then the sequence length is eight prediction cache lookup addresses. In such a situation the number of tag comparisons required per repetition of the sequence is reduced to a single comparison between the stream identifier defined from the two or more sequential prediction cache lookup addresses.

In accordance with some example configurations the data processing apparatus is provided comprising prediction circuitry to perform a prediction cache lookup in each of the plurality of ways of the prediction cache based on a given prediction cache lookup address and to determine given target information associated with the given prediction cache lookup address, wherein the prediction circuitry is adapted to, in response to the stream detector circuitry identifying that a current position in a current sequence of prediction cache lookups corresponds to a particular way prediction of a stream entry of the plurality of stream entries stored in the stream detector circuitry, determine whether to perform or suppress lookups in each prediction cache way of the prediction cache. The prediction circuitry is able to identify a stream entry stored in the stream detector circuitry that corresponds to the current sequence of prediction cache lookups. By tracking the current position in the stream the prediction circuitry is able to determine a particular way prediction of the stream entry that corresponds to the current position. In this manner the prediction circuitry is able to use information stored in the way prediction to determine which ways of the prediction cache should be looked up to determine the target behaviour and which should be suppressed. For example, in some cases the particular way prediction could determine that lookups in all but one way of the prediction cache are to be suppressed. Alternatively, the particular way prediction could contain information that indicates that all ways of the prediction cache are to be suppressed. The indication that lookups in all ways of the prediction cache are to be suppressed might be used, for example, when it is known that none of the ways of the prediction cache contain an entry for that address and a default predicted behaviour is used.

In accordance with some example configurations the data processing apparatus is provided comprising an earlier prediction cache adapted to store a plurality of earlier prediction cache entries, each earlier prediction cache entry defining an association between an earlier lookup address and earlier target information, wherein the prediction circuitry is adapted to perform the prediction cache lookup in addition to an earlier prediction cache lookup in the earlier prediction cache. The earlier prediction cache is a prediction cache that is provided hierarchically closer to processing circuitry than the prediction cache. In some embodiments the earlier prediction cache is an L0 cache and the prediction cache is an L1 cache, although in other examples the earlier prediction cache and prediction cache could be further down the cache hierarchy.

The prediction cache lookup and the earlier prediction cache lookup may be performed independently or in combination. However, in accordance with some example configurations the earlier prediction cache lookup is based on a lossy tag value generated from at least one of the two or more sequential prediction cache lookup addresses, and the lossy tag value enables a possibility of false hits in the earlier prediction cache. By configuring the earlier prediction cache to enable entries based on a lossy tag value (a tag value that comprises less information than the data from which it was generated) a size of the earlier prediction cache can be reduced. As a result, the earlier prediction cache may produce false hits. For example, if only a portion of one or both of the two or more sequential lookup addresses is used to generate the lossy tag, then a same tag could be generated for a different address where the difference corresponds to the portion that is not used to generate the lossy tag. Alternatively, where a lossy hash is used to generate the lossy tag, two different sets of one or more sequential lookup addresses could hash to a same lossy tag value. The use of stream detector circuitry for providing way predictions for the prediction cache can be particularly advantageous where the prediction cache is later in the cache hierarchy than an earlier cache which uses lossy tags. As the earlier prediction cache is already being looked up, one might expect that the earlier prediction cache could be annotated with the way prediction information to control lookups into the prediction cache. However, the lossy tags mean that such way predictions would be unreliable and could result in incorrect lookups in the prediction cache which the inventors have recognised that may be less preferred. By providing the stream detector circuitry as a separate entity, way predictions can be provided to enable/disable the way lookups in the prediction cache, without needing to incur the full power/ area cost of precise (non-lossy) tags in the earlier prediction cache. Including the stream detector circuitry, which can be provided as a relatively small additional structure, to cache way predictions can save power by avoiding every entry of the earlier prediction cache having to be expanded to use precise tags, and by saving on the power of looking up each way of the prediction cache each time a lookup is performed in the prediction cache.

The earlier target information of the earlier prediction cache may be defined in a number of ways. For example, the earlier target information could indicate target information associated with the earlier target address. Alternatively, in accordance with some example configurations the earlier target information defines a candidate prediction cache entry comprising a candidate address and candidate target information to be selected for inclusion in a subsequent prediction cache lookup. The earlier prediction cache can therefore be used as additional storage that suggests entries to be incorporated in the prediction cache lookup. The inclusion can take a number of forms. For example, the candidate prediction cache entry could be included in the prediction cache lookup by defining a new entry in the prediction cache comprising the candidate address and the candidate target information. Alternatively, additional storage could be provided for the candidate prediction cache lookup and the additional storage is checked during the prediction cache lookup.

In accordance with some example configurations the prediction circuitry is adapted to perform the earlier prediction cache lookup based on an earlier lookup address at least one cycle further ahead in the sequence of prediction cache lookup addresses than a current prediction cache lookup address. The earlier prediction cache lookup performs a lookup based on the earlier lookup address. Hence, for a sequence of addresses A-B-C-D, the earlier prediction cache may perform the earlier prediction cache lookup based on address A to predict the earlier target information associated with address C. The earlier prediction cache lookup performs this lookup in the same cycle that the prediction cache performs the lookup based on address A to predict target information associated with address B. In this way the prediction cache checks the prediction of the earlier prediction cache that was predicted one cycle earlier than the prediction cache lookup (in a previous cycle the earlier prediction cache may have predicted the information associated with address B based on an earlier lookup based on the lookup address preceding address A). Furthermore, the earlier prediction cache may provide an indication of the current prediction cache lookup address B and the target information associated with address C as a candidate prediction entry to be included in a subsequent prediction lookup.

Hence, in a next cycle, the earlier prediction cache performs the lookup based on address B resulting in earlier target information associated with address D. In the same cycle the prediction cache lookup is performed based on lookup address B and may hit on the candidate entry previously provided from the earlier prediction cache in the previous cycle to confirm the predicted target information associated with address C. Alternatively, if the transition from address A to the subsequent address in the sequence was mispredicted due to a branch misprediction for example, and turns out to be different from B which was expected based on the earlier prediction cache lookup, then this mismatch can be identified in the cycle when that next address is looked up in the prediction cache.

With such a cache hierarchy implementation which has at least one cycle offset between the timings at which the earlier prediction cache and prediction cache are looked up for the same address, it may sometimes be desired to look up both cache structures to implement the checking described above, even if there is a hit in the earlier prediction cache, which in the absence of way prediction could risk increased power consumption due to duplicate lookups. By providing the stream detector circuitry for providing way predictions as described above, this allows such a cache hierarchy to be implemented more efficiently in terms of power consumption while gaining performance benefits from the earlier prediction cache identifying candidate entries for inclusion in a subsequent prediction cache lookup (where in the absence of those candidate entries the prediction cache lookup might have missed in the prediction cache). Hence, combined with the way predictions provided by the stream detector circuitry, this provides an efficient mechanism for predicting target behaviour and verifying the prediction.

The stream detector circuitry may track the way predictions in a number of different ways. For example each unused way prediction could store a predefined value to indicate that the way prediction is unused. Alternatively, in accordance with some example configurations each stream entry of the plurality of stream entries comprises a stream length identifying a number of way predictions associated with the stream entry. This provides an efficient mechanism to determine when program flow has passed the end of a stream corresponding to a stream entry stored in the stream detector circuitry.

In accordance with some example configurations, for stream entries where the stream length is less than a maximum supported stream length, the stream length is defined based on a number of prediction cache lookup addresses observed between a sequentially first occurrence of the two or more sequential prediction cache lookup addresses and a sequentially second occurrence of the two or more sequential prediction cache lookup addresses. Where the sequence of prediction cache lookups follows a repeating pattern and the length of the repeating pattern is less than a maximum supported stream length, this mechanism allows the stream detector circuitry to store only a single repetition of the pattern. When a repeated (i.e., a second) occurrence of the two or more sequential prediction cache lookup addresses is observed, the stream detector circuitry is able to determine that the sequence of prediction cache lookups has looped and the corresponding sequence of way predictions in the stream entry will be repeated.

In accordance with some example configurations each stream entry of the plurality of stream entries comprises a position counter indicating a position in the sequence of prediction cache lookup addresses. The position counter combined with the length counter means that the stream detector circuitry is able to determine a current way prediction corresponding to the sequence of instructions and whether or not the stream entry contains way predictions corresponding to a sequentially next prediction cache lookup.

In accordance with some example configurations the stream detector circuitry is adapted to enter a prediction mode, in response to a lookup in the stream detector circuitry comprising a current two or more sequential prediction cache lookup addresses hitting in the stream detector circuitry, the prediction mode identifying an active stream entry with a corresponding stream identifier of the active stream on which the lookup in the stream detector circuitry hit. The two or more sequential prediction cache lookup addresses are compared to the stream identifier for each stream entry. The active stream is identified as the stream entry of the plurality of stream entries for which the two or more sequential entries are identified as corresponding to the stream identifier.

The stream detector circuitry can identify the active stream in a number of ways. However, in accordance with some example configurations the stream detector circuitry is adapted to, when entering the prediction mode, reset a corresponding position counter of the active stream. In this way the active stream entry can be identified based on the position counter value (optionally based on a comparison with the stream length) without the need to include further flags or information to identify the active stream. For example, where the position counter is reset to a value different to the stream length, the active stream entry could be identified as a stream entry for which the position counter is different to the stream length. Alternatively, where the position counter is reset to be equal to the stream length, the active stream can be identified as a stream in which the position counter is different to a predetermined value (e.g. zero).

In accordance with some example configurations the stream detector circuitry is adapted to, when in the prediction mode: output a sequentially next way prediction of the active stream entry based on the corresponding position counter for the active stream; and modify the corresponding position counter for the active stream entry to advance to a next position in the active stream entry. In this way, when a lookup is made in the prediction cache, the way prediction corresponding to the prediction cache lookup is made available by the stream detector circuitry, thereby allowing the suppression of ways in the prediction cache based on the way prediction. The corresponding prediction counter is also advanced to indicate the next position in the active stream in preparation for the sequentially next prediction cache lookup. The advancement of the prediction counter may be implemented by incrementing the counter or by decrementing the counter, depending on implementation choice.

When the sequence of instructions follows the pre-observed sequence, the stream detector circuitry is able to supply way predictions associated with each prediction cache lookup. However, in accordance with some example configurations the stream detector circuitry is adapted to, in response to a misprediction by the prediction cache, mark the active stream as invalid. When it is observed that the sequence of prediction cache lookups deviates from the pre-observed sequence, the sequence of way predictions stored in a stream entry will no longer accurately predict the corresponding way of the prediction cache in which a lookup should be made. In order to prevent incorrect suppression of ways in a prediction cache lookup, the active stream entry is marked as invalid and the stream detector circuitry exits the prediction mode.

In accordance with some example configurations the stream detector circuitry is adapted to operate in a training mode identifying a training stream of the plurality of streams. The training stream is the stream that is currently learning a sequence of way predictions. Where plural streams are stored in the stream detector circuitry the training stream may be detected as the most recent entry in the stream detector circuitry. This entry may be determined, for example, based on a stream identified by a current write pointer indicating a most recently written way prediction or through a dedicated flag. Alternatively, the stream detector circuitry could comprise a fixed training entry which, when the stream detector circuitry detects that training completes, is copied to a main stream detector storage. The stream detector circuitry can then train a new entry as the training entry.

In accordance with some example configurations the stream detector circuitry is adapted to, when in the training mode: store a new way prediction associated with the training stream based on the prediction cache way to be looked up to identify the prediction entry associated with the prediction cache lookup address at the given position in the sequence; modify a corresponding position counter of the training stream to indicate a next position in the training stream; and modify a corresponding stream length of the training stream to indicate addition of the new way prediction. During prediction the stream detector circuitry identifies ways of the prediction cache to be looked up or suppressed in the corresponding prediction cache lookup. During training the roles are reversed and the stream detector circuitry stores a new way prediction based on outcomes of prediction cache lookups. For example, the new way prediction could be based on an indication of which ways hit and which ways missed in the corresponding prediction cache lookup. Alternatively, the new way prediction could be based on a result of a lookup in an earlier prediction cache in the cache hierarchy (e.g. if there is a hit in the earlier prediction cache and the prediction from the earlier prediction cache ends up being used, there may be no need to look up any of the ways of the prediction cache). For example, if the prediction cache lookup hit in a first way of the prediction cache, the way prediction stored in the training stream of the stream detector circuitry could indicate that the first way of the prediction cache should be looked up at that position when the training stream becomes the active stream. Alternatively, when no ways hit in the prediction cache, it may be determined that a default predicted behaviour is used. In this situation the stream detector circuitry may store a predefined value (for example a maximum value supported by the stream detector circuitry for defining the way prediction or a value that does not correspond to a way of the prediction cache) to indicate that there is no prediction cache way to be looked up at this position in the sequence. Once the way prediction is stored, both the stream length and the position counter are modified (for example, incremented) to indicate that the stream length has increased and that the current position is at the end of the stream. Way predictions can be added to the stream entry to extend the length of the stream, until the stream detector circuitry exits prediction mode (e.g. because the stream has been found to loop back to the beginning or has encountered a return branch as described in the example below), an error occurs (e.g. a misprediction, or a fault signalled by an interrupt or exception), or the number of way predictions exceeds maximum number of way predictions that can be stored in the stream detector circuitry The stream detector circuitry is adapted to store an observed sequence of way predictions associated with a sequence of prediction cache lookups. The observed sequence of way predictions can then be used to improve performance when the sequence of prediction cache lookups is observed again. There are however situations in which it is less likely that an observed sequence will be repeated. For example, where a stream starts within a function the stream detector circuitry would have no indication regarding which instruction called the function. Hence, including a function return in the stream entry would be less reliable (i.e., it would only be useful for subsequent function calls from the same instruction). Therefore, in accordance with some example configurations the stream detector circuitry is adapted to terminate the training mode in response to a function return. To avoid divergence due to a function call, the stream entry will be terminated when the sequence of instructions consumes a return address from the return stack. However, if the return address was created during the stream, the return branch will not terminate the training mode. In other words, if a function is called and returns within the sequence of instructions represented by a single stream entry of the stream detector circuitry, the stream detector circuitry continues to record the stream. In contrast, where a function return occurs within a stream in absence of an earlier function call within the same stream, the training mode may be terminated.

In accordance with some example configurations the prediction cache is a branch target buffer, the prediction cache lookup address indicates a first block of instructions, and the target information indicates an address of a second block of instructions to be executed after the first block in the event that a branch within the first block is taken. The target information may define the address of the second block of instructions either by directly storing the address of the second block of instructions, or an offset of the second block of instructions from the first block of instructions. Typically, branch predictors are looked up more frequently than other types of predictors. Hence, the tracking of way predictions in the stream detector circuitry can be particularly beneficial as there are often few gaps between cycles in which sequences of lookups are performed, so that it is more likely that the sequence of lookup addresses loops through a stream of consistently appearing addresses that is repeated multiple times.

Particular embodiments will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The data processing apparatus 2 also has a branch predictor 40 which may include one or more branch prediction caches 42 for caching prediction information used to form predictions of branch behaviour of branch instructions to be executed by the branch unit 24. The predictions provided by the branch predictor 40 may be used by the fetch stage 6 to determine the sequence of addresses from which instructions are to be fetched from the instruction cache 8 or memory system. The branch prediction caches may include a number of different forms of cache structure, including a branch target buffer (BTB) which may cache entries specifying predictions of whether certain blocks of addresses are predicted to include any branches, and if so, the instruction address offsets (relative to the start address of the block) and predicted target addresses of those branches. Also the branch prediction caches 42 could include branch direction prediction caches which cache information for predicting, if a given block of instruction addresses is predicted to include at least one branch, whether the at least one branch is predicted to be taken or not taken. The data processing apparatus 2 further includes recovery circuitry 44 to, in response to detecting a misprediction by the branch predictor 40 based on the predicted behaviour, perform a recovery action (e.g. flushing the pipeline 4 of instructions beyond the address for which the mispredictions occurred, and resuming execution from the misprediction point). When a mispredictions occurs or when the branch unit 24 resolves an actual branch outcome for a new branch not previously predicted based on the prediction state in the branch prediction caches 42, the information in the branch prediction caches 42 may also be updated based on the actual branch outcome.

Figure 2:
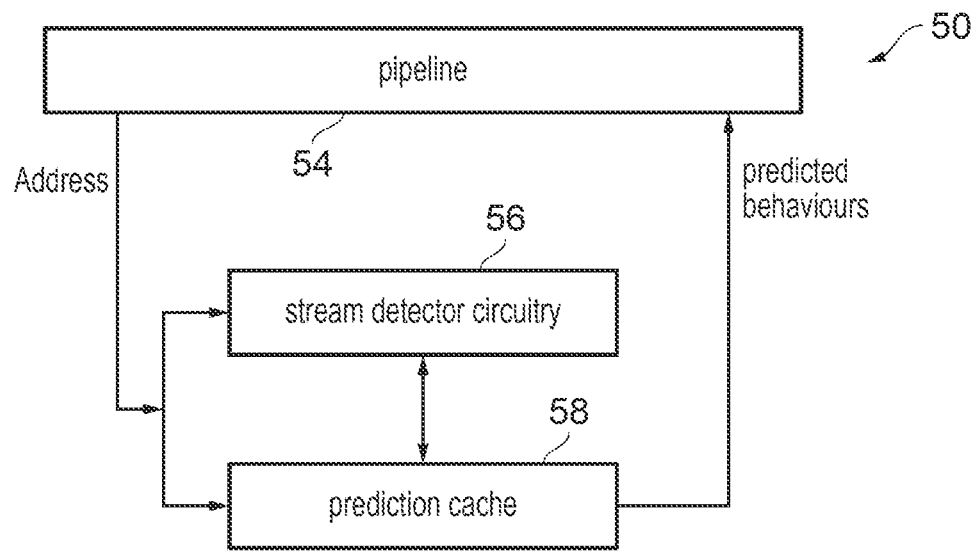
FIG. 2 schematically illustrates details of a data processing apparatus comprising stream detector circuitry and a prediction cache.

FIG. 2 schematically illustrates a data processing apparatus 50 according to some example configurations. The data processing apparatus 50 includes processing pipeline 54 which may contain any of the components described with reference to the pipeline 4 of FIG. 1. In addition, the data processing apparatus 50 includes a prediction cache 58 and stream detector circuitry 56. The stream detector circuitry 56 and the prediction cache receive, as an input, at least one lookup address from the processing pipeline 54. The prediction cache 58 performs a prediction cache lookup based on the address to determine target information and, hence, predicted behaviour associated with the address. In particular, the address defines a block of instructions which may contain one or more branch instructions. The predicted behaviour output from the prediction cache 58 defines a next block of instructions to be processed subsequent to the block of instructions defined by the address. The prediction cache 58 has associativity greater than one hence, a lookup in the prediction cache 58 comprises the generation of an index based on at least a portion of the address. The index indicates a cache set which is split into a plurality of ways. The predicted behaviour is determined from a corresponding way of the plurality of ways in which a tag value derived from the address (e.g. using a portion of the address not used to generate the index) corresponds to a tag value corresponding to the lookup address that is stored in the corresponding way.

In order to improve the efficiency of the lookup in the prediction cache 58 there is provided stream detector circuitry 56 to store a plurality of stream entries. Each of the stream entries comprises a stream identifier and a plurality of corresponding way predictions. As discussed the stream detector circuitry 56 can operate in training mode during which the stream detector circuitry 56 records a sequence of ways corresponding to a sequence of lookups in the prediction cache 58. In addition, the stream detector circuitry 56 can operate in a prediction mode in which the stream detector circuitry tracks a position in a stream of addresses input into the stream detector circuitry 56 and the prediction cache 58. Based on the tracked position the stream detector circuitry 56 outputs a way prediction corresponding to the address. The way prediction is received by the prediction cache 58 and used to determine which ways of the prediction cache 58 are to be looked up and which ways of the prediction cache 58 are to be suppressed. The predicted behaviour is fed back to the pipeline 54 which can determine whether to fetch a next block of instructions defined in the predicted behaviour.

Figure 3:
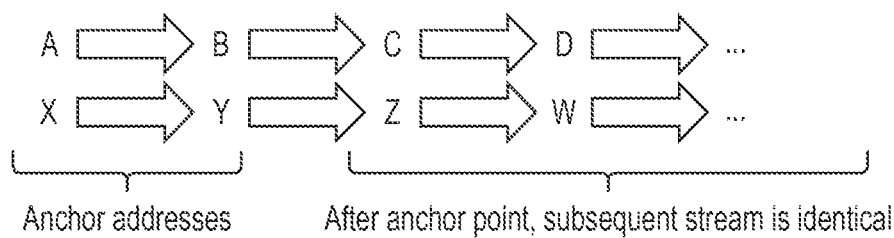
FIG. 3 schematically illustrates details of a sequence of prediction cache lookup addresses corresponding to a stream identified by stream detector circuitry.

FIG. 3 schematically illustrates behaviour of the stream detector circuitry according to some example configurations. The stream detector circuitry stores a stream identifier based on at least two anchor addresses. Each stream is determined to be uniquely identified by the at least two addresses. Addresses looked up subsequent to the at least two are assumed to follow the pre-observed pattern. In particular, when the stream detector is in training mode and observes a first pair of addresses (A,B) a new stream entry is stored with a stream identifier based on addresses A and B. Subsequently, when a prediction cache lookup is performed based on address C and address D, way information corresponding to the prediction cache lookup is stored in as a way prediction in the stream entry for each of the addresses. In particular, a way prediction is stored based on the prediction cache lookup address C and another way prediction is stored based on the prediction cache lookup address D. When the prediction cache operates in prediction mode, the stream becomes active in response to an identification of the first pair of addresses (A,B). Subsequently, the stream detector circuitry can output way predictions that define which ways of the prediction cache are to be looked up and which ways of the prediction cache are to be suppressed for each of the address lookups. Similarly, the stream detector circuitry can store a second stream entry with stream identifier based on lookup addresses X and Y. The stream detector circuitry determines which stream entry of the stream detector circuitry is active based on the stream identifiers. Thereafter, the stream detector circuitry is able to output way predictions corresponding to the particular stream entry that has been observed.

Figure 4:
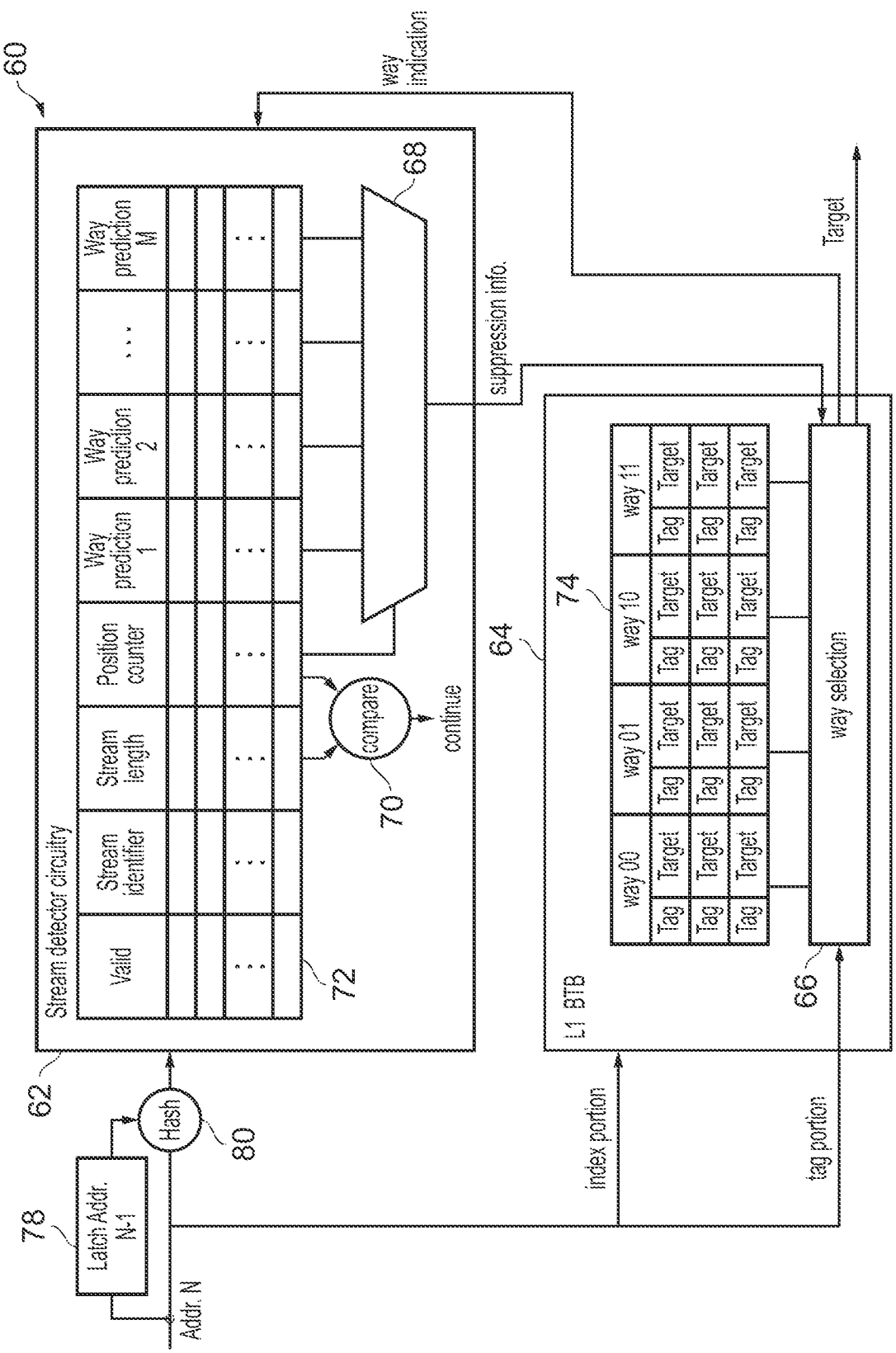
FIG. 4 schematically illustrates details of stream detector circuitry and a prediction cache.

FIG. 4 schematically illustrates further details of a data processing apparatus 60 according to some example configurations. The data processing apparatus 60 includes stream detector circuitry 62 and L1 (level 1) BTB 64. The L1 BTB is an example of the prediction cache as discussed above. The stream detector circuitry 62 stores a plurality of stream entries 72. Each stream entry has a valid indicator, a stream identifier, a stream length, a position counter, and a plurality of way predictions including way predictions 1 through to M. The stream detector circuitry takes, as an input, a tag generated using hash circuitry 80 by performing a hash of a current address (Addr. N) and a latched address (Addr. N–1) stored in latch circuitry 78. The stream detector circuitry 2 further includes comparison circuitry 70 and multiplexer circuitry 68. The comparator circuitry 70 determines which stream entry (if any) of the plurality of stream entries 72 corresponds to an active stream (by comparing the tag value generated by hash circuitry 80 against the stream identifier field of one or more stream entries 72). When the comparator circuitry 70 determines that a particular stream entry of the plurality of stream entries 72 is an active stream, the stream detector circuitry outputs the way prediction indicated by the position counter. In particular, the position counter corresponding to the active stream is provided to the multiplexer 68 which selects the corresponding way prediction from the plurality of way predictions to be output to the L1 BTB 64.

L1 BTB 64 stores a plurality of cache sets 74. Each cache set 74 comprises a plurality of ways (way 00, way 01, way 11, and way 11) and way selection circuitry 66. For each cache set 74 each of the plurality of ways stores a tag portion and target information. When a lookup address is provided (Addr. N), an index portion of the lookup address is provided to the L1 BTB 64 to determine which cache set of the plurality of cache sets 74 is to be provided to the way selection circuitry 66. A tag portion derived from the lookup address (e.g. by extracting a portion of bits from the lookup address, or by applying a hash function to a portion of bits of the lookup address) is also provided to the way selection circuitry 66 of the L1 BTB 64. The way selection circuitry 66 is configured to compare the tag portion to the corresponding tag portion in each way of the selected cache set. When the stream detector circuitry 62 is in prediction mode, suppression information may be provided to the way selection circuitry 66. In response the way selection suppresses the lookup in the ways indicated by the suppression information (e.g. preventing at least the comparison of the tag value of that way against the tag portion associated with the lookup address, although optionally the readout of the tag value of that way could also be suppressed). If the tag portion hits on a tag in a way of the selected cache set then the corresponding target is output as target information. An indication of which way (if any) hit in the way selection circuitry 66 is also provided to the stream detector circuitry 62 for inclusion as a way prediction of the plurality of way predictions when the stream detector circuitry is operating in training mode.

In some example configurations the stream detector circuitry 62 tracks a given stream entry based on circuit logic implementing operations corresponding to the following pseudo code:

```
if (tag hit){
  position_counter=0//initialize position counter to reset stream entry to indicate the start of the stream has been reached;
} else if (correction from prediction cache) {
  //set position counter to max value to indicate that predictions should be stopped for this stream
  position_counter=0xffff (stop prediction)
} else if (position_counter=stream_length) {
  // currently in training mode, modify position counter and stream
  // length to account for new way prediction being added to the stream entry;
  position_counter++
  stream_length++
} else if (position_counter<stream_length) {
  // currently in prediction mode, modify position counter of active stream entry;
  position_counter++
}else if (allocate) {
  // allocate new stream in the stream detector circuitry with valid=1
  position_counter=0
  stream_length=0
  stream_identifier=derived from corresponding addresses
}
```

The stream detector circuitry 62 makes a prediction when "position_counter<stream_length" is satisfied. For the case in which "position_counter=stream_length" no predictions are made by the stream detector circuitry 62.

By providing stream detector circuitry 62 that follows the above pseudo code a position within an active stream (position counter different from stream length) can be tracked in a prediction mode by modifying the position counter and new streams can be stored when in a training mode (stream counter equal to position counter) by modifying both the position counter and the stream length. The above pseudo code could be modified to incorporate alternative methods of tracking the active and training streams such as including specific flags to indicate training and active streams or having a particular training entry portion of the stream detector circuitry 62 for a currently training stream. So this pseudocode represents just one example.

FIG. 5 schematically illustrates the storage of a sequence of way predictions in the stream detector circuitry. In the illustrated example, a repeated sequence of prediction cache lookup addresses A-B-C-D is considered. Table 82 indicates the state of a single stream entry 72 corresponding to that stream A-B-C-D, as it is updated each lookup cycle. Initially 82(A), when address A is received, it is assumed that the stream detector circuitry has no stored stream entries. As there is no preceding address no entry is entered in the stream detector. The address A is latched as the latched address 78 for reference in a subsequent lookup.

At step 82(B) a new lookup address (B) is received. As there are no current entries in the stream detector circuitry, a new entry is created. The stream has a stream identifier based on a hash of the current address (B) and the latched address (A). The stream length and the stream position are initialised to zero although it would be readily apparent to the person of ordinary skill in the art that any value could be used. In addition, address B is looked up in the prediction cache 84. A first portion of address B is used to determine which index (set) of the prediction cache is to be looked up, in the illustrated example, the first portion of address B corresponds to index 1. The prediction cache 84 determines that the tag portion of address B hits in way 01 of the prediction cache. This information is provided to the stream detector circuitry which stores the entry "001" as way prediction 0. The initial zero in the way prediction indicates that address B has hit in the prediction cache 84. The final two bits "01" indicate that the target information is stored in way 01 of the prediction cache 84. It will be appreciated this is just one possible encoding of the way prediction information and other encodings could also be used to provide similar information.

At step 82(C) a new lookup address (C) is received. The stream detector circuitry determines that the stream detector circuitry is in training mode and that the stream with stream identifier (A,B) is the stream that is currently being trained. A hashed version of the current address (C) and the latched address (B) is compared to the stream entry that is currently training (to detect whether the stream has looped back to the beginning of the stream so that the stream should be terminated in length). Optionally, the hashed version of the current address (C) and the latched address (B) could also be compared with tags of other stream entries 72 to check for cases when the stream has converged on an earlier stream which already has been allocated a stream entry in the stream detector circuitry 62 (e.g. in that case it may be preferred to halt training of the current stream to avoid storing redundant information in the stream detector). However, this comparison against other streams would not be essential.

When it is determined that the stream identifier of the training entry does not correspond to the hashed version of the current address (C) and the latched address (B) (and in the absence of any other reason to halt training of the stream entry currently being trained, such as occurrence of an interrupt or exception, a branch misprediction, or identification that there is already another stream entry starting from the currently looked up addresses B, C), the stream length and the position counter are incremented to indicate the occurrence of a new prediction lookup corresponding to lookup address C and the extension of the stream to encompass the additional address C. In addition, address C is looked up in the prediction cache 84. A first portion of address C is used to determine which index of the prediction cache is to be looked up, in the illustrated example, the first portion of address C may, for example, correspond to index 5. However, the prediction cache 84 determines that none of the prediction cache ways correspond to the tag portion of address C. Hence, the address C misses in the prediction cache and (assuming the lookup also misses in any subsequent level of prediction cache, if provided) the predicted next address is the address of the sequentially next block of instructions (D) (sequential in memory address space, due to a not taken branch being predicted for example). This information is provided to the stream detector circuitry which stores the entry "111" as way prediction 1. The entry "111" is a predetermined value that indicates that lookups in all ways of the prediction cache circuitry should be suppressed because there is no corresponding entry in the prediction cache 84. In some example configurations, in which the hashed version of the current address (C) and the latched address (B) are also be compared to all existing stream entries as mentioned above, the stream length and the position counter are incremented when it is determined that there are no existing entries that correspond to the hashed version of the current address (C) and the latched address (B).

At step 82(D) a new lookup address (D) is received. The stream detector circuitry determines that the stream detector circuitry is in training mode and that the stream with stream identifier (A,B) is the stream that is currently being trained. A hashed version of the current address (D) and the latched address (C) is compared to the training stream entry. When it is determined that there the training stream entry does not correspond to the hashed version of the current address (D) and the latched address (C), the stream length and the stream position are incremented to indicate the occurrence of a new prediction lookup corresponding to lookup address D and the extension of the stream to encompass the additional address D. In addition, address D is looked up in the prediction cache 84. A first portion of address D is used to determine which index of the prediction cache is to be looked up, in the illustrated example, the first portion of address D corresponds to index 3. The prediction cache 84 determines that the tag portion of address D hits in way 10 of the prediction cache. This information is provided to the stream detector circuitry which stores the entry "010" as way prediction 2. The initial zero in the way prediction indicates that address D has hit in the prediction cache 84. The final two bits "10" indicate that the target information is stored in way 10 of the prediction cache 84.

At step 82(E) a new lookup address (A) is received. The stream detector circuitry determines that the stream detector circuitry is in training mode and that the stream with stream identifier (A,B) is the stream that is currently being trained. A hashed version of the current address (A) and the latched address (D) is compared to the training stream entry. When it is determined that there that the training stream entry does not correspond to the hashed version of the current address (A) and the latched address (D), the stream length and the stream position are incremented to indicate the occurrence of a new prediction lookup corresponding to lookup address A. In addition, address A is looked up in the prediction cache 84. A first portion of address A is used to determine which index of the prediction cache is to be looked up, in the illustrated example, the first portion of address A corresponds to index 3. The prediction cache 84 determines that the tag portion of address A hits in way 10 of the prediction cache. This information is provided to the stream detector circuitry which stores the entry "010" as way prediction 2. The initial zero in the way prediction indicates that address A has hit in the prediction cache 84. The final two bits "10" indicate that the target information is stored in way 10 of the prediction cache 84.

At step 82(F) a new lookup address (B) is received. The stream detector circuitry determines that the stream detector circuitry is currently in training mode and that the stream with stream identifier (A,B) is the stream that is currently being trained. A hashed version of the current address (B) and the latched address (A) is compared to the training stream entry. In this case is determined that the hashed version of the current address (B) and the latched address (A) correspond to the stream identifier (A,B). Hence, the position counter of the stream identified by the stream identifier (A,B) is reset to indicate that the stream detector circuitry is in prediction mode and that the active stream is the one identified by stream identifier (A,B). The stream detector circuitry determines a way prediction to be output based on the position counter. In this case, the position counter indicates that way prediction 0 should be output to the prediction cache 84. Hence, the prediction cache 84 is provided with the prediction that address B will hit in way 01. The prediction cache determines that the corresponding cache set is cache set with index 1 from the index portion of the address B and, based on way prediction 0 output from the stream detector circuitry, determines that the target information is found in way 01. Based on this information, the prediction cache is able to suppress the lookups in way 00, way 10 and way 11. By incrementing the position counter in response to the next input address, the stream detector circuitry is able to continue making way predictions for the sequence of lookup addresses.

Figure 6:
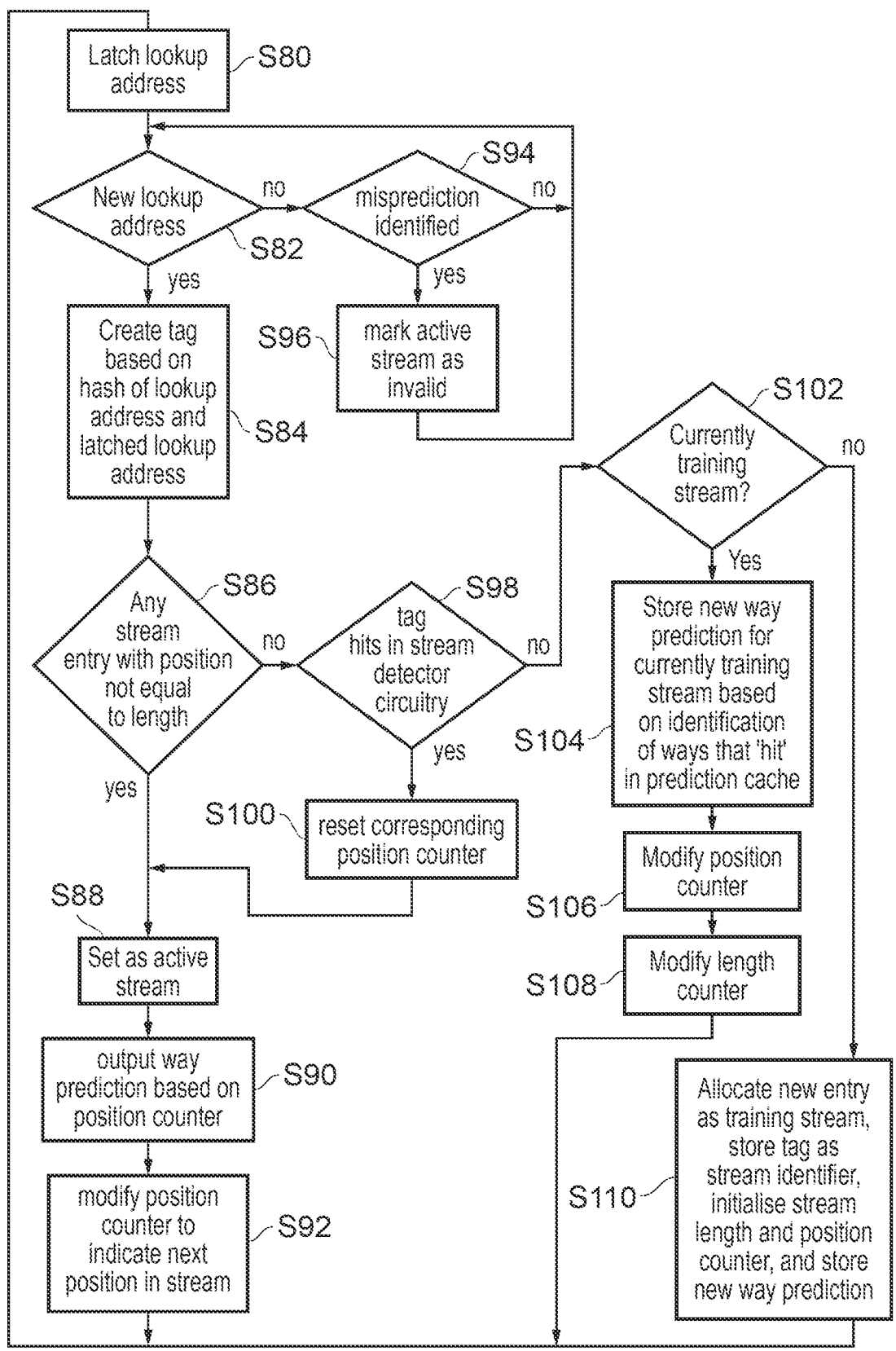
FIG. 6 schematically illustrates a sequence of steps carried out by stream detector circuitry.

FIG. 6 schematically illustrates a sequence of steps carried out by the stream detector circuitry according to various example configurations. At step S80 a previous lookup address is latched before flow moves on to step S82. At step S82 it is determined whether a new lookup address has been input to the stream detector circuitry. If yes then flow proceeds to step S84. If no then flow proceeds to step S94.

If, at step S82, it was determined that there is no new lookup address flow proceeds to step S94 where it is determined whether a misprediction has been identified. If no then flow returns to step S82. If, at step S94, it is determined that a misprediction has been identified then flow proceeds to step S96 where the currently active stream is marked as invalid before flow returns to step S82.

If, at step S82, it was determined that a new lookup address had been input into the stream detector circuitry then flow proceeds to step S84 where a tag is created based on a hash of the lookup address and the latched lookup address. Flow then proceeds to step S86 where it is determined whether there are any stream entries in the stream detector circuitry with a position counter that is not equal to the stream length. As discussed, other methods of determining the active stream are possible. For example, an active flag could be provided for each entry. Alternatively, where different rules are applied to the position counter and stream length the active entry could be determined from a predetermined combination of the counters (e.g. if counting of stream position is based on decrementing the counter from its reset value equal to the stream length, with the stream being ended when the counter reaches zero, then step S86 could instead identify an active entry as an entry having a non-zero position counter value).

If, at step S86, an active entry is identified then flow proceeds to step S88. If, at step S86, no active stream is identified then flow proceeds to step S98 where it is determined whether the tag (created based on a hash of the lookup address and the latched address) hits in the stream detector circuitry. It is noted that the tag comparison of step S98 need only be carried out in a cycle for which no active streams have been identified. When there is an existing active stream this will be identified in step S86 and, as such, the total number of tag comparisons for an active stream is reduced. If the tag does not hit in the stream detector circuitry, then flow proceeds to step S102. If, at step S98, it was determined that the tag does hit in the stream detector circuitry then flow proceeds to step S100 where the position counter of the stream entry for which a hit was determined is reset to a value indicating that the program flow has reached the start of the stream (e.g. 0 in the example of FIG. 5). Flow then proceeds to step S88.

At step S88 the stream for which the position entry is not equal to the length is set as the active stream. Flow then proceeds to step S90 where the stream detector circuitry outputs a way prediction based on the current value of the position counter. Flow then proceeds to step S92 where the position counter is modified to indicate the next position in the stream entry. Flow then returns to step S80.

If at step S98 it was determined that the tag does not hit in the stream detector circuitry flow proceeds to step S102 where it is determined if there is a currently training stream. If no then flow proceeds to step S110 where a new training stream is allocated. This process involves storing, as the stream identifier, information indicating the tag created at step S84, initialising the stream length and position counter to their initial values (e.g. zero) and storing a new way prediction based on identification of the ways that hit in the prediction cache. Flow then returns to step S80.

If however, at step S102, it is determined that there is a currently training stream then flow proceeds to step S104 where a new way prediction is stored for the currently training stream based on an indication from the prediction cache indicating the way (if any) that hits in the prediction cache. Flow then proceeds to step S106 where the position counter is modified to advance to the next position within the stream sequence. Flow then proceeds to step S108 where the length counter is modified to indicate that a new way prediction has been stored. Flow then returns to step S80.

While FIG. 6 shows steps being performed sequentially, it will be appreciated that the steps shown in FIG. 6 could be reordered to be performed in a different order (e.g. steps S104, S106 and S108 could be performed in a different order to the one shown), and some steps could be performed in parallel.

Figure 7:
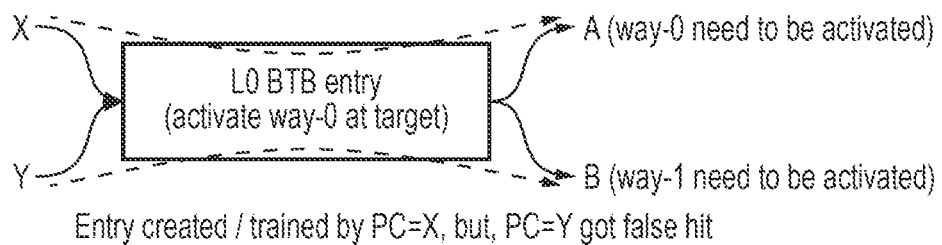
FIGS. 7 and 8 schematically illustrate details of an earlier prediction cache that allows false hits.

In some example configurations an earlier prediction cache is also provided. In particular, the earlier prediction cache may be adapted to allow false hits. FIG. 7 schematically illustrates behaviour of a prediction cache where false hits are allowed. In accordance with some example configurations the prediction cache of FIG. 2 may be provided with an earlier prediction cache. The earlier prediction cache may tag the target behaviour in a lossy way so as to reduce the circuit area and power usage of the earlier prediction cache. As illustrated, a first prediction cache lookup address X may correspond to a target behaviour A stored in way 0 of the prediction cache, and a second prediction cache lookup address Y may correspond to a target behaviour B stored in way 1 of the prediction cache. However, where a lossy tag format is used, among the set of addresses (including X and Y) which alias onto the same set, the tag is not large enough to uniquely distinguish between each of those addresses. Hence, if the earlier prediction cache is used as the structure for providing the way prediction information, the presence of false hits could result in the address Y being looked up in the earlier prediction cache and returning the way prediction information associated with address X by mistake, which could result in the wrong way of prediction cache being looked up. Hence, surprisingly even if an earlier prediction cache is provided to be looked up at an earlier level of a cache hierarchy than the prediction cache for which way predictions are tracked, the earlier prediction cache may not be able to provide the way prediction information reliably. The stream detector helps to address this problem.

Figure 8:
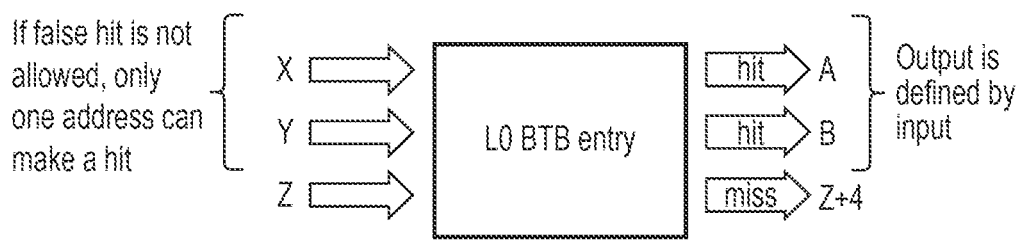

If false hits are possible in the earlier prediction cache (e.g. L0 BTB), one may question whether the stream model shown in FIG. 3 can be trusted, since one may expect that the possibility of false hits may lead to loss in reliability of any repeating pattern within the lookup address sequence that could be exploited by the stream detector. However, the inventors recognised that this is not in fact the case. FIG. 8 schematically illustrates details of how a cache which allows false hits can provide, for a given set of predictor state stored in the earlier prediction cache, a consistent output for any given input (it is not possible to have different outputs generated for the same input). In the illustrated embodiment input addresses X and Y each map to the same entry in the earlier prediction cache (L0 BTB). The prediction cache entry contains information that is used in combination with the input address to generate the output. For example, the earlier prediction cache entry could define an offset in address space which, combined with the input address uniquely defines an output address. Alternatively, the earlier prediction cache entry could define a parameter that in combination with the input address, is used in a function to determine the output address. In the illustrated example input address X hits on the entry in the earlier prediction cache. The entry in the earlier prediction cache is used in combination with the input address X and results in an output A corresponding to the input X. The only output address that can be generated for input address X, based on the current state defined by the hit L0 BTB entry, is the output address A. Similarly, for an input address Y the prediction cache hits on the same entry as address X and outputs B as the predicted behaviour. As before, given a particular input address Y and a particular value of state stored in the hit L0 BTB entry, the only output that can be generated is output B. Similarly, when an entry misses in the earlier prediction cache, then for a given input the output is consistent for that address. For example, if an address Z is input into the prediction cache then, if there is no entry corresponding to the input Z the input address will miss in the prediction cache and the output will be defined by incrementing Z to point to the next address. Therefore, in the absence of misprediction, even in the presence of false hits, the stream of predictions output by the earlier prediction cache still follows a consistent pattern for a given pair of starting addresses in the stream.

Figure 9:
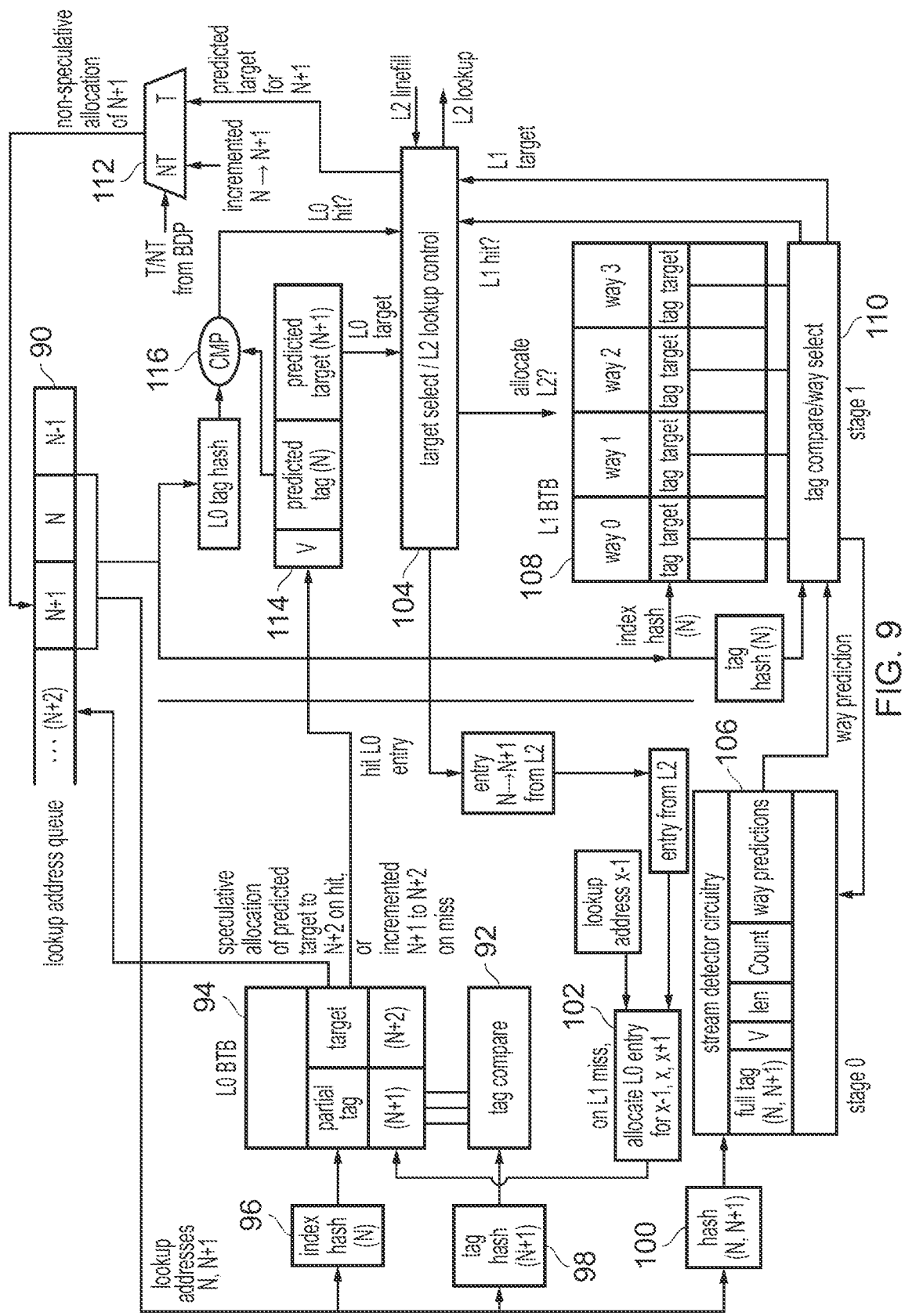
FIG. 9 schematically illustrates details of interactions between a prediction cache, an earlier prediction cache and stream detector circuitry.

FIG. 9 schematically illustrates a data processing apparatus according to some example configurations. The data processing apparatus is provided with L0 BTB 94, L1 BTB 108, stream detector circuitry 106, tag comparison circuitry 110 and target selection/lookup control circuitry 104. The L0 BTB 94 and L1 BTB 108 are configured to provide predictions of addresses of blocks of instructions to add to the lookup address queue 90. L0 BTB 94 works one cycle ahead of L1 BTB 108. In particular, for a given address sequence L0 BTB 94 predicts lookup address N+2 based on lookup addresses N and N+1. L0 BTB 94 is configured such that false hits are possible. In contrast L1 BTB 108 predicts lookup address N+1 based on lookup address N in address queue 90. L1 BTB 108 is configured such that the predicted address N+1 output by L1 BTB 108 can be used to confirm that the prediction of L0 BTB 94, which was made one cycle earlier and is based on the assumption that address N+1 would follow address N, is not incorrect (e.g. due to an earlier misprediction for the transition from address N to N+1). The L0 BTB 94 and the stream detector circuitry 106 operate one cycle ahead of the L1 BTB 108.

In the illustrated embodiment, L0 BTB 94 is a set associative cache that is indexed using a hash of lookup address N which is generated using hashing circuitry 96. L0 BTB 94 is tagged using a hash of a portion of lookup address N+1 that does not fully distinguish between all the addresses that share the hash index N. The tag portion hash is generated using hash circuitry 98. The hash generated by hash circuitry 98 and the ways corresponding to the hashed index generated by hash circuitry 96 fed into L0 BTB 94 are passed to tag comparison circuitry 92. The tag comparison circuitry 92 determines if there is an entry in L0 BTB 94 that hits in response to the lookup address pattern N, N+1. When there is a hit L0 BTB provides the entry as an additional entry 114 to be included in a subsequent L1 BTB lookup, i.e., in a next lookup cycle. Optionally, the L0 BTB 94 may speculatively also provide the predicted lookup address N+2 to the lookup address queue 90. Basing the index on lookup address N and the tag on lookup address N+1 is just one example for addressing the L0 BTB. In other examples the index or tag could depend on both lookup address N and lookup address N+1. Alternatively a fully associative structure could be provided in which case there is no index and the tag portion could depend on both lookup address N and lookup address N+1.

The stream detector circuitry 106 takes as input a hash of address N and N+1 generated by hash circuitry 100. Unlike the L0 BTB 94, the stream detector circuitry 106 generates the input hash of a full tag and, as such, does not allow false hits. As previously described, when the stream detector circuitry 106 is in prediction mode, the stream detector circuitry 106 outputs a way prediction to the tag comparison circuitry 110 for use in the next prediction cycle. The way prediction predicts which ways of the L1 BTB 108 are to be looked up and which are to be suppressed when performing the lookup for the address looked up in a next lookup cycle of the L1 BTB 108. Hence, in a first stage, the L0 BTB 94 provides additional entry 114 to be included in the subsequent L1 BTB lookup and the stream detector circuitry 106 provides a way prediction to be used by the tag comparison circuitry 110 in the subsequent L1 BTB lookup. In particular, the illustrated additional entry 114 shows the entry generated in a preceding cycle by the L0 BTB 94 mapping lookup address N to target N+1 (addresses N+1, N+2 from stage 0 in one lookup cycle become addresses N, N+1 shown in stage 1 in the following lookup cycle).

As discussed, the L1 BTB 108 operates one cycle behind the L0 BTB 94 and the stream detector circuitry 106. Hence, during the cycle in which the L0 BTB 94 and the stream detector circuitry 106 are preparing the additional entry mapping N+1 to N+2 and the way prediction for address lookup N+1, the L1 BTB takes as input lookup address N. The L1 BTB 108 is indexed by a hash of an index portion of lookup address N and the corresponding cache set of the L1 BTB is read out to the tag comparison circuitry 110. A hash of the tag portion of lookup address N is provided to the tag comparison circuitry 110. In addition, when the stream detector circuitry is in a prediction mode, the tag comparison circuitry 110 is also provided with a way prediction associated with lookup address N that has been provided from the stream detector circuitry 106 during a previous cycle. The tag comparison circuitry 110 determines which ways are to be looked up and which ways are to be suppressed when performing the tag comparison of each way provided from the cache set of the L1 BTB 108. The tag comparison circuitry 110 provides an indication of whether there was a hit in the L1 BTB 110 and, if there was a hit, an indication of the target provided by the entry that hit to the target selection circuitry 104. In addition, the tag comparison circuitry 110 provides an indication as to which way (if any) hit in the cache line to the stream detector circuitry 106. The stream detector circuitry 106 uses this information to store new way predictions when in a training phase or (optionally) to verify that the way predictions stored in an active stream entry are accurate when in a prediction mode (some implementations could choose not to incur the cost of this verification, as the cost of implementing the verification on each cycle may be considered less than the cost of occasional mispredictions due to incorrect way information).

The target selection circuitry 104 takes an indication as to whether there was a hit in the L1 BTB 108 and, if there was a hit, an indication as to the L1 target behaviour. In addition, the target selection circuitry 104 takes an indication of whether the additional entry 114 provided by the L0 BTB 94 in a previous cycle hits and, if it does, an indication of the L0 target. The target selection circuitry 104 compares the L0 tag and the lookup address N to verify that the predictions made by the L0 BTB 94 are accurate (or equivalently, this comparison can be viewed as looking up address N in the candidate entry 114 provided by the L0 BTB 94 for inclusion in the L1 lookup) and, provides the predicted target for address N+1 to multiplexer 112. Multiplexer 112 determines whether to provide the target address N+1 to the lookup address queue 90 or whether to provide an increment of address N based on an indication as to whether a branch indicated in the block of instructions with instruction address N is taken or not taken (the taken/not-taken prediction may be generated by a branch direction predictor, not shown in FIG. 9, which is a separate prediction structure from the BTB structures shown in FIG. 9). Based on the result, the multiplexor 112 provides a non-speculative prediction of the address N+1 for the block of instructions N+1 to the lookup address queue 90.

When the target selection circuitry 104 determines that a predicted target cannot be determined, for example, due to a miss in the tag comparison circuitry 110, the target selection circuitry 104 performs a lookup in a lower level BTB (e.g. level 2 BTB). If the lower level lookup misses in the lower level BTB, or if a target is not returned in time, then the target selection circuitry can wait for the outcome of the branch to be determined by the branch unit 24 at the execute stage 16 and, if the branch which missed in the entire BTB turns out to be taken, consider allocating a new L1 BTB entry to indicate the target address of the taken branch. When the target selection circuitry determines that there is a hit in the lower level BTB the target selection circuitry 104 may allocate a new entry to the L1 BTB 108 and/or to the L0 BTB 94. Where an allocation is made into the L0 BTB 94, the new entry is allocated by allocation circuitry 102 based on the lookup address provided to the lower level cache (lookup address x), the target behaviour (lookup address x+1) and a latched preceding lookup address (lookup address x−1 which precedes the address x which was looked up in the lower level cache). In this way the L0 BTB 94 is allocated an entry which is able to predict one cycle ahead of the L1 BTB 108. Note that, in the snapshot shown in FIG. 9, addresses x−1, x, x+1 may correspond to addresses N−1, N, N+1 from a number of cycles earlier than the cycle shown in the snapshot of FIG. 9, with the number of cycles by which addresses x−1, x, x+1 lags N−1, N, N+1 being dependent on the delay associated with looking up the level 2 BTB for example.

Using the stream detector circuitry 106, as described in relation to FIG. 9, where the L0 BTB 94 and the L1 BTB 108 are operating in a cycle-offset way provides way predictions that can be used to save power in the L1 BTB 108 lookup whilst also supporting the cost-saving of using partial tags in the L0 BTB 94 lookup. This is particularly useful for the cycle-offset example because of the need to verify the L0 BTB 94 lookups using the L1 BTB 108. This means that there is a potential for redundant lookups in the L1 BTB 108 even when the stream is fully covered by the L0 BTB 94 prediction. Hence, the number of lookups in the L1 BTB 108 can be reduced.

Figure 10:
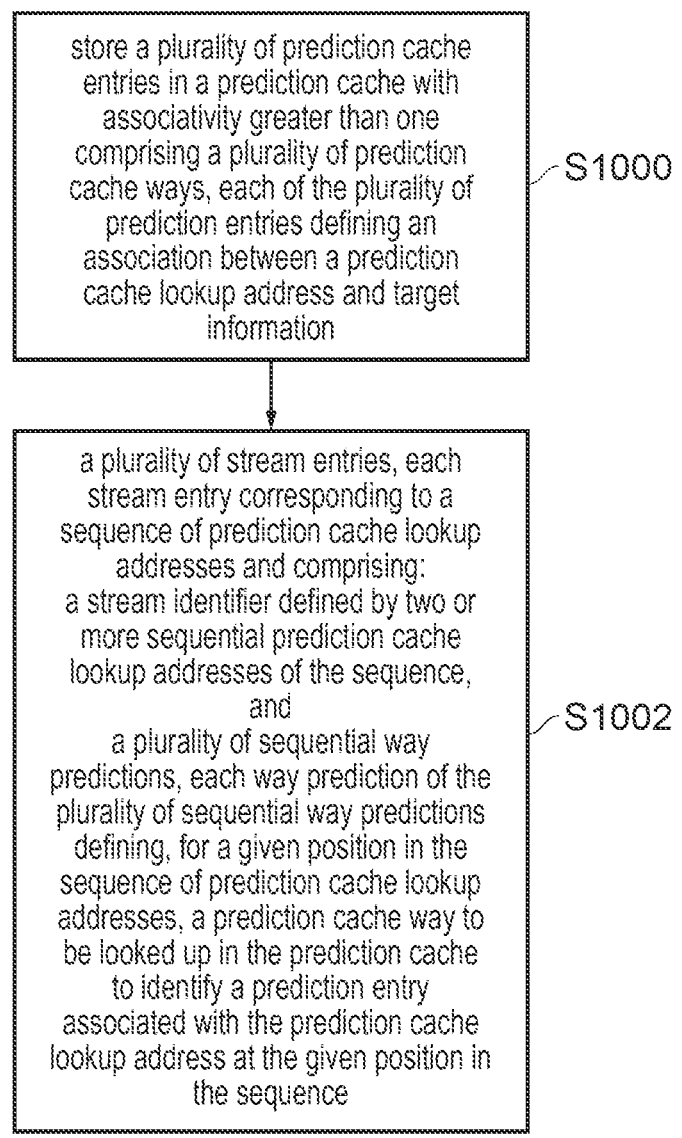
FIG. 10 schematically illustrates a sequence of steps carried out by the data processing apparatus.

FIG. 10 schematically illustrates a sequence of steps carried out in some example configurations. At step S1000 the data processing apparatus stores a plurality of prediction cache entries in a prediction cache with associativity greater than one comprising a plurality of prediction cache ways, each of the plurality of prediction entries defining an association between a prediction cache lookup address and target information. Flow then proceeds to step S1002 where the data processing apparatus stores a plurality of stream entries, each stream entry corresponding to a sequence of prediction cache lookup addresses and comprising: a stream identifier defined by two or more sequential prediction cache lookup addresses of the sequence, and a plurality of sequential way predictions, each way prediction of the plurality of sequential way predictions defining, for a given position in the sequence of prediction cache lookup addresses, a prediction cache way to be looked up in the prediction cache to identify a prediction entry associated with the prediction cache lookup address at the given position in the sequence.

In brief overall summary there is provided a data processing apparatus and method for storing a plurality of prediction cache entries in a prediction cache with associativity greater than one comprising a plurality of prediction cache ways, each of the plurality of prediction entries defining an association between a prediction cache lookup address and target information; and storing a plurality of stream entries, each stream entry corresponding to a sequence of prediction cache lookup addresses and comprising: a stream identifier defined by two or more sequential prediction cache lookup addresses of the sequence, and a plurality of sequential way predictions, each way prediction of the plurality of sequential way predictions defining, for a given position in the sequence of prediction cache lookup addresses, a prediction cache way to be looked up in the prediction cache to identify a prediction entry associated with the prediction cache lookup address at the given position in the sequence.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
   a prediction cache with associativity greater than one comprising a plurality of prediction cache ways to store a plurality of prediction entries, each of the plurality of prediction entries defining an association between a prediction cache lookup address and target information;

stream detector circuitry to store a plurality of stream entries, each stream entry corresponding to a sequence of prediction cache lookup addresses and comprising:
   a stream identifier defined by two or more sequential prediction cache lookup addresses of the sequence, and
   a plurality of sequential way predictions, each way prediction of the plurality of sequential way predictions defining, for a given position in the sequence of prediction cache lookup addresses, a prediction cache way to be looked up in the prediction cache to identify a prediction entry associated with the prediction cache lookup address at the given position in the sequence.

2. The data processing apparatus of claim 1, comprising prediction circuitry to perform a prediction cache lookup in each of the plurality of ways of the prediction cache based on a given prediction cache lookup address and to determine given target information associated with the given prediction cache lookup address,
   wherein the prediction circuitry is adapted to, in response to the stream detector circuitry identifying that a current position in a current sequence of prediction cache lookups corresponds to a particular way prediction of a stream entry of the plurality of stream entries stored in the stream detector circuitry, determine whether to perform or suppress lookups in each prediction cache way of the prediction cache.

3. The data processing apparatus of claim 2, comprising an earlier prediction cache adapted to store a plurality of earlier prediction cache entries, each earlier prediction cache entry defining an association between an earlier lookup address and earlier target information, wherein the prediction circuitry is adapted to perform the prediction cache lookup in addition to an earlier prediction cache lookup in the earlier prediction cache.

4. The data processing apparatus of claim 3, wherein the earlier prediction cache lookup is based on a lossy tag value generated from at least one of the two or more sequential prediction cache lookup addresses, and the lossy tag value enables a possibility of false hits in the earlier prediction cache.

5. The data processing apparatus of claim 3, wherein the earlier target information defines a candidate prediction cache entry comprising a candidate address and candidate target information to be selected for inclusion in a subsequent prediction cache lookup.

6. The data processing apparatus of claim 3, wherein the prediction circuitry is adapted to perform the earlier prediction cache lookup based on an earlier lookup address at least one cycle further ahead in the sequence of prediction cache lookup addresses than a current prediction cache lookup address.

7. The data processing apparatus of claim 1, wherein each stream entry of the plurality of stream entries comprises a stream length identifying a number of way predictions associated with the stream entry.

8. The data processing apparatus of claim 7, wherein, for stream entries where the stream length is less than a maximum supported stream length, the stream length is defined based on a number of prediction cache lookup addresses observed between a sequentially first occurrence of the two or more sequential prediction cache lookup addresses and a sequentially second occurrence of the two or more sequential prediction cache lookup addresses.

9. The data processing apparatus of claim 7, wherein each stream entry of the plurality of stream entries comprises a position counter indicating a position in the sequence of prediction cache lookup addresses.

10. The data processing apparatus of claim 9, wherein the stream detector circuitry is adapted to enter a prediction mode, in response to a lookup in the stream detector circuitry comprising a current two or more sequential prediction cache lookup addresses hitting in the stream detector circuitry, the prediction mode identifying an active stream entry with a corresponding stream identifier of the active stream on which the lookup in the stream detector circuitry hit.

11. The data processing apparatus of claim 10, wherein the stream detector circuitry is adapted to, when entering the prediction mode, reset a corresponding position counter of the active stream.

12. The data processing apparatus of claim 10, wherein the stream detector circuitry is adapted to, when in the prediction mode:
output a sequentially next way prediction of the active stream entry based on the corresponding position counter for the active stream; and
modify the corresponding position counter for the active stream entry to advance to a next position in the active stream entry.

13. The data processing apparatus of claim 10, wherein the stream detector circuitry is adapted to, in response to a misprediction by the prediction cache, mark the active stream as invalid.

14. The data processing apparatus of claim 9, wherein the stream detector circuitry is adapted to operate in a training mode identifying a training stream of the plurality of streams.

15. The data processing apparatus of claim 14, wherein the stream detector circuitry is adapted to, when in the training mode:
store a new way prediction associated with the training stream based on the prediction cache way to be looked up to identify the prediction entry associated with the prediction cache lookup address at the given position in the sequence;
modify a corresponding position counter of the training stream to indicate a next position in the training stream; and
modify a corresponding stream length of the training stream to indicate addition of the new way prediction.

16. The data processing apparatus of claim 14, wherein the stream detector circuitry is adapted to terminate the training mode in response to a function return.

17. The data processing apparatus of claim 1, wherein the prediction cache is a branch target buffer, the prediction cache lookup address indicates a first block of instructions, and the target information indicates an address of a second block of instructions to be executed after the first block in the event that a branch within the first block is taken.

18. A data processing method comprising:
storing a plurality of prediction cache entries in a prediction cache with associativity greater than one comprising a plurality of prediction cache ways, each of the plurality of prediction entries defining an association between a prediction cache lookup address and target information; and
storing a plurality of stream entries, each stream entry corresponding to a sequence of prediction cache lookup addresses and comprising:
a stream identifier defined by two or more sequential prediction cache lookup addresses of the sequence, and
a plurality of sequential way predictions, each way prediction of the plurality of sequential way predictions defining, for a given position in the sequence of prediction cache lookup addresses, a prediction cache way to be looked up in the prediction cache to identify a prediction entry associated with the prediction cache lookup address at the given position in the sequence.

* * * * *